United States Patent
Sampei et al.

[11] 3,759,941
[45] Sept. 18, 1973

[54] INSECTICIDAL ISOXAZOLE DERIVATIVES

[75] Inventors: Nobuyoshi Sampei; Kazuo Tomita; Hideakira Tsuji, all of Tokyo, Japan

[73] Assignee: Sankyo Company Limited, Tokyo, Japan

[22] Filed: May 5, 1970

[21] Appl. No.: 34,867

Related U.S. Application Data

[63] Continuation-in-part of Ser. No. 812,965, March 20, 1969, abandoned, Continuation-in-part of Ser. No. 573,211, Aug. 18, 1966, abandoned.

[30] Foreign Application Priority Data

| Aug. 20, 1965 | Japan | 40/50835 |
|---|---|---|
| Sept. 4, 1965 | Japan | 40/54144 |
| Sept. 11, 1965 | Japan | 40/55537 |
| Sept. 13, 1965 | Japan | 40/56025 |
| July 5, 1966 | Japan | 41/43202 |

[52] U.S. Cl.............................. 260/307 H, 424/272
[51] Int. Cl............................................ C07d 85/22
[58] Field of Search................................ 260/307 H

[56] References Cited
UNITED STATES PATENTS
3,216,894 11/1965 Lorenz.................................. 167/22

FOREIGN PATENTS OR APPLICATIONS
1,404,889 5/1965 France
713,278 8/1954 Great Britain Primary Examiner—Alex Mazel
Assistant Examiner—R. V. Rush
Attorney—McGlew and Toren

[57] ABSTRACT

Insecticidally active 3-hydroxyisoxazole compounds represented by the formula

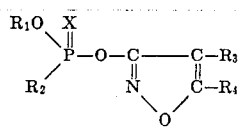

wherein
$R_1$ is alkyl group, preferably having one to five carbon atoms;
$R_2$ is alkoxy group, preferably having one to five carbon atoms or phenyl group;
$R_3$ is hydrogen, halogen or alkyl group, preferably having one to five carbon atoms;
$R_4$ is hydrogen, alkyl group, preferably having one to 10 carbon atoms, phenyl group which may be substituted with such substituent or substituents as alkyl, alkoxy, halogen, nitro or cyano, alkoxycarbonyl, preferably having two to six carbon atoms, amino group, or dialkoxymethyl group having one to five carbon atoms in each alkoxy moiety; and
X is sulfur or oxygen atom.

Method for combatting harmful insects which comprises applying to said insects an insecticidally effective amount of a compound having the above formula.

11 Claims, No Drawings

INSECTICIDAL ISOXAZOLE DERIVATIVES

CROSS-REFERENCE TO PRIOR APPLICATIONS:

This application is a continuation-in-part of U.S. Pat. Ser. No. 812,965 filed Mar. 20, 1969, now abandoned which in turn is a streamlined continuation of U.S. Pat. application 573,211 filed Aug. 18, 1966, now abandoned.

This invention relates to new and useful isoxazole derivatives and also to insecticidal compositions containing, as an active ingredient, at least one of these isoxazole derivatives.

More particularly, this invention is directed to novel 3-hydroxy isoxazole derivatives having the formula

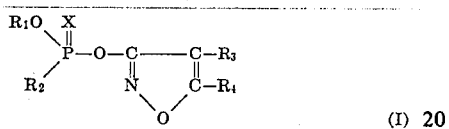

(I)

wherein $R_1$ is an alkyl group, preferably having one to five carbon atoms;

$R_2$ is an alkoxy group, preferably having one to five carbon atoms or phenyl group;

$R_3$ is hydrogen, halogen or an alkyl group, preferably having one to five carbon atoms;

$R_4$ is hydrogen, an alkyl group, preferably having one to 10 carbon atoms, a phenyl group which may be substituted with such substituent or substituents as alkyl, alkoxy, halogen, nitro or cyano, alkoxy-carbonyl, preferably having 2 to 6 carbon atoms, an amino group, or dialkoxymethyl group having one to five carbon atoms in each alkoxy moiety; and X is sulfur or oxygen atom.

It is also directed to insecticidal compositions containing, as an active ingredient, at least one of the aforesaid 3-hydroxy isoxazole derivatives (I).

Now, it has been found by us that the aforesaid 3-hydroxy isoxazole derivatives (I) exhibit high insecticidal activities and hence may be applied for controlling or combatting a wide variety of harmful insects including flies, cockroaches, rice borers, plant hoppers, leaf hoppers, mites, aphids,etc.

It is therefore an object of this invention to provide novel 3-hydroxy isoxazole derivatives of the aforesaid formula (I) which exhibit potent insecticidal activities.

Another object of this invention is to provide insecticidal compositions containing as an active ingredient at least one of the aforesaid 3-hydroxy isoxazole derivatives (I).

Still another object of this invention is to provide an effective method for controlling harmful insects with a toxic amount of at least one of the aforesaid isoxazole derivatives (I).

These and other objects will be apparent from the following detailed description.

The novel 3-hydroxy isoxazole derivatives (I) of this invention are novel compounds unknown in the prior art and may be prepared by a process which comprises reacting a compound of the formula

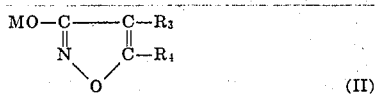

(II)

wherein M is hydrogen, alkali metal, such as, sodium or potassium, or ammonium group and $R_3$ and $R_4$ are as defined above with a compound of the formula

(III)

wherein $R_1$, $R_2$ and X are as defined above in the presence or absence of an acid-binding agent such as alkali metal alcoholate, hydroxide, carbonate or bicarbonate or organic base, as represented schematically as follows;

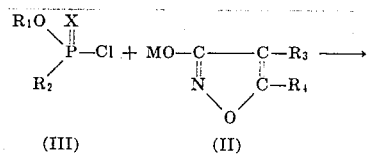

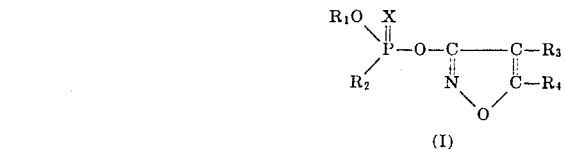

In the above-mentioned reaction, when the above M represents hydrogen an, acid-binding agent should be employed and, when the above M represents other than hydrogen, it is not necessary to employ an acid-binding agent.

In carrying out the process for the preparation of the 3-hydroxy isoxazole derivative (I) as set forth above, the reaction may be preferably conducted in an inert organic solvent, e.g., acetone, methyl ethyl ketone, dimethylformamide, benzene and the like. The reaction temperature is not a critical feature, but the reaction may be usually and preferably carried out at room temperature or at the reflux temperature of the solvent employed. Examples of acid-binding agents which may be employed in this process include alkali metal carbonates, e.g., sodium and potassium carbonates, alkali metal bicarbonates, e.g. sodium and potassium bicarbonates and organic bases, e.g., trimethylamine, triethylamine, pyridine, but other substances commonly employed as an acid binding agent in the art may be favourably utilized in this process.

After completion of the reaction, the reaction product may be easily recovered from the reaction mixture by a conventional means. For instance, the insoluble substance which precipitates in situ is filtered off and the solvent is removed by distillation from the filtrate. The resulting residue is dissolved in a water-immiscible solvent, e.g., benzene and toluene and the resulting solution is washed successively with aqueous alkali carbonate and water. After drying, the solvent is distilled off under reduced pressure to give the desired product, which may be, if desired, further purified through vacuum distillation, chromatography and the like.

The starting compounds (III) in this process are all novel compounds which can be easily prepared, for example, by reacting a α, β-halogenocarboxylic acid ester or an α, β-unsaturated carboxylic acid ester with hydroxylamine in the presence of an sufficient amount of caustic alkali to maintain the reaction medium in an alkaline pH range.

Among the novel 3-hydroxy isoxazole derivatives (I) of this invention, there can be mentioned as a group of preferable compounds those 3-hydroxy isoxazole derivatives represented by the formula

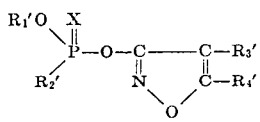

wherein $R'_1$ is methyl or ethyl; $R'_2$ is methoxy, ethoxy or phenyl; $R'_3$ is hydrogen, methyl, ethyl, chlorine or bromine; $R'_4$ is hydrogen, alkyl group of one to 10 carbon atoms, phenyl, a phenyl group substituted with nitro, cyano, chloro, methyl or methoxy, amino, methoxycarbonyl, ethoxycarbonyl or diethoxymethyl; and X is sulfur or oxygen atom.

As illustrative of the 3-hydroxy novel isoxazole derivatives (I) of this invention are given the following compounds;

| Compound No. | Isoxazole compounds of this invention | Physical property |
|---|---|---|
| 1 | O,O-Diethyl O-3-isoxazolyl phosphorothioate | bp.90°C/0.2mmHg (bath temperature) |
| 2 | O,O-Diethyl O-(5-methyl-3-isoxazolyl) phosphate | bp.123°C/0.2mmHg (bath temperature) |
| 3 | O,O-Diethyl O-(5-methyl-3-isoxazolyl) Phosphorothioate | bp.120°–123°C/0.2 mmHg (bath temperature) |
| 4 | O,O-Dimethyl O-(5-methyl-3-isoxazolyl) phosphorothioate | bp.120°C/0.2mmHg (bath temperature) |
| 5 | O,O-Diethyl O-(5-n-propyl-3-isoxazolyl) phosphorothioate | bp.120°C/0.2mmHg (bath temperature) |
| 6 | O,O-Diethyl O-(5-i-butyl-3-isoxazolyl) phosphorothioate | colorless oil * |
| 7 | O,O-Diethyl O-(5-n-decyl-3-isoxazolyl) phosphorothioate | bp.160°C/0.2mmHg (bath temperature) |
| 8 | O,O-Diethyl O-(4,5-dimethyl-3-isoxazolyl) phosphorothioate | bp.110°C/0.2mmHg (bath temperature) |
| 9 | O,O-Diethyl O-(5-ethoxycarbonyl-3-isoxazolyl) phosphorothioate | bp.150°C/0.2mmHg (bath temperature) |
| 10 | O,O-Diethyl O-(5-phenyl-3-isoxazolyl) phosphorothioate | bp.160°C/0.15mmHg (bath temperature) |
| 11 | O,O-Dimethyl O-(5-methoxy-carbonyl-3-isoxazolyl) phosphorothioate | bp.125°C/0.1mmHg (bath temperature) |
| 12 | O,O-Diethyl O-(5-methyl-4-bromo-3-isoxazolyl)phosphorothioate | bp.153°C/0.2mmHg (bath temperature) |
| 13 | O,O-Dimethyl O-(5-diethoxy-methyl-3-isoxazolyl) phosphorothioate | bp.120°C/0.1mmHg (bath temperature) |
| 14 | O,O-Diethyl O-(5-amino-3-isoxazolyl) phosphorothioate | yellow oil * |
| 15 | O,O-Diethyl O-(5-p-chlorophenyl-3-isoxazolyl) phosphorothioate | Pale yellow oil * |
| 16 | O,O-Diethyl O-(5-p-methylphenyl-3-isoxazolyl) phosphorothioate | colorless oil * |
| 17 | O,O-Diethyl O-(5-m-methoxyphenyl-3-isoxazolyl) phosphorothioate | colorless oil * |
| 18 | O,O-Diethyl O-(5-p-methoxyphenyl-3-isoxazolyl) phosphorothioate | pale yellow oil * |
| 19 | O,O-Diethyl O-(5-p-cyanophenyl-3-isoxazolyl) phosphorothioate | m.p.60°–63°C. |
| 20 | O,O-Dimethyl O-(5-p-cyanophenyl-3-isoxazolyl) phosphorothioate | pale yellow oil * |
| 21 | O,O-Diethyl O-(5-(2,4-dichlorophenyl)-3-isoxazolyl) phosphorothioate | pale yellow oil * |
| 22 | O-Ethyl O-(5-amino-3-isoxazolyl) phenylphosphonothioate | yellow oil * |
| 23 | O,O-Diethyl O-(5-p-nitrophenyl-3-isoxazolyl) phosphorothioate | m.p.88°–89°C. |
| 24 | O,O-Diethyl O-(5-m-nitrophenyl-3-isoxazolyl) phosphorothioate | m.p.42.5°–43°C. |
| 25 | O-Ethyl O-(3-isoxazolyl) phenylphosphonothioate | bp.140°C/0.1mmHg (bath temperature) |
| 26 | O-Ethyl O-(5-methyl-3-isoxazolyl) phenylphosphonothioate | bp.135°–140°C/0.1mmHg (bath temperature) |
| 27 | O-Ethyl O-(5-methyl-4-bromo-3-isoxazolyl) phenylphosphonothioate | bp.130°–135°C/0.05mmHg (bath temperature) |
| 28 | O-Ethyl O-(5-diethoxymethyl-3-isoxazolyl) phenylphosphonothioate | bp.163°C/0.04mmHg (bath temperature) |
| 29 | O-Ethyl O-(4,5-dimethyl-3-isoxazolyl) phenylphosphonothioate | bp.140°C/0.04mmHg (bath temperature) |
| 30 | O-Ethyl O-(5-methoxycarbonyl-3-isoxazolyl) phenylphosphonothioate | bp.155°C/0.04mmHg (bath temperature) |
| 31 | O-Ethyl O-(5-phenyl-3-isoxazolyl) phenylphosphonothioate | yellow oil * |
| 32 | O,O-Dimethyl O-(5-phenyl-3-isoxazolyl) phosphorothioate | yellow oil * |
| 33 | O,O-Diethyl O-(5-methoxycarbonyl-3-isoxazolyl phosphorothioate | colorless oil * |
| 34 | O,O-Diethyl O-(4-chloro-5-phenyl-3-isoxazolyl) phosphorothioate | colorless oil * |
| 35 | O,O-Dimethyl O-(5-phenyl-3-isoxazolyl) phosphorothioate | colorless oil * |
| 36 | O,O-Diethyl O-(4-chloro-5-methyl-3-isoxazolyl) phosphorothioate | colorless oil * |
| 37 | O,O-Dimethyl O-(4-chloro-5-methyl-3-isoxazolyl) phosphate | colorless oil * |
| 38 | O,O-Dimethyl O-(4-chloro-5-methyl-3-isoxazolyl) phosphorothioate | colorless oil * |
| 39 | O,O-Diethyl O-(4-chloro-5-phenyl-3-isoxazolyl) phosphate | colorless oil * |
| 40 | O,O-Dimethyl O-(5-methyl-3-isoxazolyl) phosphate | colorless oil * |
| 41 | O,O-Dimethyl O-(4-chloro-5-phenyl-3-isoxazolyl) phosphorothioate | colorless oil * |
| 42 | O,O-Dimethyl O-(4-chloro-5-phenyl-3-isoxazolyl) phosphate | colorless oil * |

* After purification by silica-gel chromatography for elementary analysis

In formulating the present isoxazole derivatives of the aforesaid formula (I) into the insecticidal composition of this invention, there may be prepared any of the various forms including dusts, wettable powders, liquids, granules, aerosols and the like, by way of a conventional technique known to those skilled in the art.

In the preparation of liquids, they may be prepared by dissolving the active isoxazole compound (I) in a suitable solvent such as benzene, xylene, acetone, solvent naphtha and the like or by dispersing the said isoxazole compound (I) in a suitable dispersing medium such as, for example, those solvents given hereinabove with the aid of a surface active dispersing agent which may be anionic, cationic or non-ionic, for example, polyoxyalkylene derivatives of alcohols, phenols and organic acids, oil-soluble petroleum sulfonates and polyoxyethylene derivatives of glycerol, glycols and the like.

Dusts and granules may be prepared by mixing the active isoxazole compound (I) in and on an inert solid carrier such as clay, talc, bentonite, diatomaceous earth and the like.

Wettable powders may be prepared by mixing the active isoxazole compound (I) with an inert solid carrier such as, for example, any of those carriers given hereinabove and a suitable surface active dispersing agent illustrated above.

Other formulations containing as an active ingredient the active isoxazole compound (I) may be prepared by a conventional means.

The above-mentioned compositions may also contain other suitable adjuvants for the purpose of promoting effectiveness of the active ingredient.

The present composition may be in admixture with other fungicides such as organic mercury, arsenic or sulfur fungicides or pentachlorobenzyl-alcohol; chlorinated insecticides, such as, BHC or DDT; other organic phosphoric insecticides such as Dimethoate [0,0-dimethyl S-(N-methylcarbamoylmethyl) phosphorodithioate], Smithion [0,0-dimethyl 0-3-methyl-4-nitrophenylphosphorothioate; Registered Trade Mark; Sumitomo Chemical Co. Ltd., Japan]; carbamate insecticides; pyrethroids, such as, pyrethrin or allethrin; various acaricides; various foliar fertilizers; or plant growth regulators.

The concentration of the active compound of this invention may usually be within the range of about 0.1 – 95 percent by weight, and preferably about 0.5 – 70 percent by weight, based upon the total weight of the composition, although the amount of the active ingredient employed will be widely varied mainly based upon such factors as the form of the specific composition, the degree of insect damage, the toxicity of the active ingredient and the like. It is, of course, understood that the amount of the active ingredient is not a critical feature of this invention.

The method for controlling harmful insects in this invention comprises contacting said insects with an insecticidally effective amount of the active compound (I). The active compound is, of course, to be applied in such an amount sufficient to exert the desired insecticidal effect, usually in a concentration of about 5 ppm or higher for liquid preparations, e.g. liquids and diluted wettable powders and in a dose rate of about 7 – 50 g. of the active compound per 10 ares for solid preparations, e.g. dusts and granules.

In order to illustrate the present invention, there are given the following examples which describe the preparation of the active compound (I), the formulation of the insecticidal composition containing as an active ingredient the active compound (I) of this invention and the insecticidal activity of the active compound (I) of this invention.

EXAMPLE 1

0,0-Diethyl 0-(5-methyl-3-isoxazolyl) phosphorothioate

To a solution of 1.0 g. of 3-hydroxyisoxazole in 10 ml. of benzene was added 1.12 g. of triethylamine and to the resulting solution was added 2.1 g. of 0,0-diethyl thiophosphorochloride at $10 \pm 2°$ C. The resulting mixture was stirred at that temperature for 3 hours and at room temperature for further 1 hour. Then, the whole mixture was shaken with 20ml. of benzene and 7 ml. of water and the benzene layer was washed with 10 percent aqueous sodium carbonate and then water. After drying over anhydrous sodium sulfate, the solvent was distilled off from the reaction mixture to give 2.5 g. of the desired product (b.p. 120° – 123° C./0.2mmHg., colorless liquid).

EXAMPLE 2

0,0-Diethyl 0-(5-phenyl-3-isoxazolyl) phosphorothioate

To a solution of 1.5 g. of 3-hydroxy-5-phenylisoxazole in 30 ml. of acetone was added 1.15 g. of anhydrous sodium carbonate. After stirring for 4 – 5 hours, to the mixture was added 1.95 g. of 0,0-diethyl thiophosphorochloride and then the resulting mixture was stirred for additional several hours. After completion of the reaction, the reaction mixture was treated in the same manner as in Example 1 to give 2.6 g. of the desired product (b.p. 160° C./0.15mmHg, bath temperature, pale yellow liquid).

EXAMPLE 3

The above-listed compounds (No.1 – No.24) are dissolved in a suitable amount of acetone to form a 0.001 percent solution, respectively. When the solution thus obtained is applied to house flies (*Musca domestica vicina Macquart*) and German cockroaches (*Blattela germanica Linne'*) by spraying, 100 percent mortalities of the said insects can be observed with all the compound employed.

EXAMPLE 4

The above-listed compounds (No.25 – No.33) dissolved in acetone are topically applied to almond moth (*Ephestia cautella*) in a dosage of 0.05 μg. per one imago.

The treated insects are placed in a room maintained at a temperature of 25° C. and a humidity of 60 – 70 percent. After 24 hours, mortalities of the said insects are investigated. With all compounds employed, there are observed 100 percent mortalities of the said insects.

EXAMPLE 5

The emulsions are prepared by mixing the following components;

| Component | Parts by weight |
|---|---|
| Active isoxazole compound * | 50 |
| Paracol ** | 20 |
| Xylene | 30 |

* Selected from the group of the aforesaid compounds No.2, No.8, No.13, No.15 and No.26.
** Trade name of the surface active agent manufactured and sold by Nihon Emulsifier Co. Ltd. (a mixture of polyehylenealkyl ether 20%, polyethylene aryl ether 40%, dodecyl benzene sulfonate 30%, and xylene 10%).

a. The rice plants in conventional pots are inoculated with the eggs of rice stem borers in the first generation and, after hatching, the larvae are allowed to attack the plants. After 5 days, the above emulsion is, after dilution with 1,000 parts of water, applied to the said plants by spraying in an amount of 25 ml. per three pots. On 5th days after application, the stems are torn and then numbers of surviving larvae therein are investigated. With all the compounds employed, there are observed more than 90 percent mortalities of the larvae.

b. Seedlings of rice plants are dipped for 10 seconds in the above emulsion which is diluted with 1,500 parts of water and then covered with a wire netting cage. Into this cage are introduced 10 small brown planthoppers (*Laodelphax striatellus*). Upon investigation after 24 hours, 100 percent mortalities of the said insects are obtained.

EXAMPLE 6

The wettable powders are prepared by mixing and pulverizing the following components;

| Component | Parts by weight |
|---|---|
| Active isoxazole compound * | 30 |
| Gosenol ** | 2 |
| Monogen *** | 3 |
| Clay | 65 |

* Selected from the group of the aforesaid compounds No.3, No.12, No.13, No.14 and No.26.
** Trade name of the surface active agent manufactured and sold by Nihon Gosei Kagaku Kogyo K. K. (polyvinyl alcohol)
*** Trade name of the surface active agent manufactured and sold by Daiichi Kogyo Seiyaku K.K. (sodium higher alcohol sulfate)

a. Several leaves of cabbage are dipped for 10 seconds in the suspension obtained by dilution of the above emulsion with 1,000 parts of water. Other leaves of cabbage upon which cabbage aphids (*Brevicoryne brassicae Linne'*) live are placed on the above-treated leaves respectively. Upon investigation after 24 hours, more than 90 percent mortalities of the said insects are obtained.

b. The suspension employed in the foregoing paragraph is applied by spraying to the raddish attacked by two-spotted spider mite (*Tetranychus urticae*) in an amount of 20 ml. per one raddish. Upon investigation after 24 hours, 100 percent mortalities of the said insects are obtained.

EXAMPLE 7

The dusts are prepared by mixing and pulverizing the following components;

| Component | Parts by weight |
|---|---|
| Active isoxazole compound * | 2 |
| Clay | 98 |

* Selected from the group of the aforesaid compounds No.3, No.10, No.12 and No.26.

By employing the dusts thus prepared, more than 90 percent mortality of small brown planthopper is obtained at a rate of 3 – 4 kg. per 10 acre.

The preparation of the starting material (II) which may be employed in this invention is illustratively disclosed hereinbelow by means of some Preparations which will be incorporated herein as a reference.

PREPARATION 1

To a solution of 4.9 g. of ethyl propiolate in 100 ml. of ethanol is added a solution of 13.9 g. of hydroxylamine hydrochloride in 180 ml. of a 10 percent aqueous sodium hydroxide solution and the mixture is allowed to stand at room temperature overnight. Thereafter, the reaction mixture is made acidic with concentrated hydrochloric acid and the acidic mixture is extracted with ether three times. The combined extract is washed with saturated aqueous solution of sodium chloride, dried over anhydrous sodium sulfate and then the ether distilled off. The residue is recrystallized from n-hexane to give 2.5 g. of 3-hydroxyisoxazole as white crystals melting at 98° – 99° C.

PREPARATION 2

To a solution of 5.6 g. of ethyl tetrolate in 100 ml. of ethanol is added a solution of 13.9 g. of hydroxylamine hydrochloride in 180 ml. of a 10 percent aqueous sodium hydroxide solution and the mixture is allowed to stand at room temperature overnight. Thereafter, the reaction mixture is treated in the same manner as in the Preparation 1 to give 3.3 g. of 3-hydroxy-5-methylisoxazole as colorless needles melting at 85° – 86° C.

PREPARATION 3

To a solution of 6.9 g. of ethyl phenylpropiolate in 160 ml. of ethanol is added a solution of 8.4 g. of hydroxide solution and the mixture is allowed to stand at room temperature overnight. Thereafter, the pH of the reaction mixture is adjusted to pH 2.0 with concentrated hydrochloric acid and the acidic mixture is extracted twice with ether. The combined extract is thoroughly washed with water, dried over anhydrous sodium sulfate and subsequently the ether is distilled off. The residue is recrystallized from ethanol to give 5.6 g. of 3-hydroxy-5-phenylisoxazole as white prisms melting at 163° – 165° C.

What is claimed is:

1. A compound having the formula

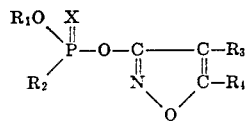

wherein $R_1$ is alkyl of one to five carbon atoms; $R_2$ is alkoxy of one to five carbon atoms or phenyl; $R_3$ is hydrogen, halogen or alkyl of one to five carbon atoms; $R_4$ is hydrogen, alkyl of one to 10 carbon atoms, phenyl which may be substituted with methyl, methoxy, halogen, nitro or cyano, alkoxycarbonyl of two to six carbon atoms, amino or dialkoxymethyl of one to five carbon atoms in each alkoxy moiety; and X is sulfur or oxygen atom.

2. A compound having the formula

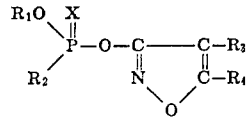

wherein $R'_1$ is methyl or ethyl; $R'_2$ is methoxy, ethoxy or phenyl; $R'_3$ is hydrogen, methyl, ethyl, chlorine or bromine, $R'_4$ is hydrogen, alkyl group of one to 10 carbon atoms, phenyl, a phenyl group substituted with nitro, cyano, chloro, methyl or methoxy, amino, methoxycarbonyl, ethoxycarbonyl or diethoxymethyl; and X is a sulfur or oxygen atom.

3. 0,0-Diethyl 0-(5-phenyl-3-isoxazolyl) phosphorothioate.
4. 0,0-Dimethyl 0-(5-phenyl-3-isoxazolyl) phosphorothioate.
5. 0,0-Diethyl 0-(5-methyl-3-isoxazolyl) phosphorothioate.
6. 0,0-Dimethyl 0-(5-methyl-3-isoxazolyl) phosphorothioate.
7. 0,0-Dimethyl 0-(4-chloro-5-methyl-3-isoxazolyl) phosphate.
8. 0,0-Diethyl 0-(4-chloro-5-phenyl-3-isoxazolyl) phosphate.
9. 0,0-Dimethyl 0-(4-chloro-5-methyl-3-isoxazolyl) phosphorothioate.
10. 0,0-Dimethyl 0-(5-methyl-3-isoxazolyl) phosphate.
11. 0,0-Diethyl 0-(4-chloro-5-phenyl-3-isoxazolyl)-phosphorothioate.

* * * * *